United States Patent [19]

Avakian

[11] 3,880,486

[45] Apr. 29, 1975

[54] APPARATUS AND SYSTEM FOR INTERCONNECTING CIRCUITS AND ELECTRONIC COMPONENTS

[75] Inventor: Emik A. Avakian, Crestwood, N.Y.

[73] Assignee: EPIS Corporation, Glastonbury, Conn.

[22] Filed: Mar. 5, 1973

[21] Appl. No.: 337,838

[52] U.S. Cl. ...... 339/17 M; 174/68.5; 317/101 CC; 339/18 C; 339/61; 339/126 RS; 339/278

[51] Int. Cl. .... H05k 7/12

[58] Field of Search ........ 174/153 R, 148 R, 68.5; 317/101 DH, 101 CC, 101 CP; 339/17, 18, 19, 59, 60, 61, 119, 120, 125, 126, 198 E

[56] References Cited

UNITED STATES PATENTS

| | | | |
|---|---|---|---|
| 2,586,854 | 2/1952 | Myers | 339/17 E X |
| 2,919,421 | 12/1959 | Modrey | 339/126 RS X |
| 2,948,773 | 8/1960 | Hawes | 339/126 RS X |
| 3,078,596 | 2/1963 | Sweeton | 339/18 R |
| 3,086,074 | 4/1963 | Just et al. | 339/126 RS X |
| 3,104,925 | 9/1963 | MacNamara | 339/126 RS |
| 3,212,049 | 10/1965 | Mittler et al. | 339/18 R |
| 3,263,200 | 7/1966 | Kocmich | 339/126 RS X |
| 3,576,493 | 4/1971 | Tachick et al. | 339/113 R X |
| 3,671,920 | 6/1972 | Iantorno et al. | 339/59 R |
| 3,743,890 | 7/1973 | Neu | 317/101 CP |

OTHER PUBLICATIONS

RCA Technical Notes, RCA TN No. 607, March 1965, "Assembly of Contact Strips," Damerau and Kaufmann.

*Primary Examiner*—Roy D. Frazier
*Assistant Examiner*—Terrell P. Lewis
*Attorney, Agent, or Firm*—Charles A. Warren

[57] ABSTRACT

A connector element or plug for use in circuit boards is a double-ended plug with an interconnecting shank between the larger head portion at one end and a smaller head or retainer portion at the other end, and this plug is positioned in a hole in a circuit board with the larger head overlying one surface of the board and a circuit thereon, and with the retainer extending beyond the hole at the opposite side of the board to hold the plug in position. The connector element establishes an electrical connection from the circuit contacted thereby to another circuit or to another connector element in another circuit board overlying the first board. Alternatively, the connector element has a central recess to receive a connector pin from a circuit external to the circuit board as, for example, a pin in a dual-in-line package or a contact on a leadless IC package and makes a connection from said pin to the circuit on the board contacted by the connector element.

21 Claims, 7 Drawing Figures

APPARATUS AND SYSTEM FOR INTERCONNECTING CIRCUITS AND ELECTRONIC COMPONENTS

BACKGROUND OF THE INVENTION

Circuit boards used in miniaturization of electronic equipment are being increasingly emphasized. Such circuit boards have conductive lines of a circuit or circuits located on one or both surfaces placed thereon by any of several well known techniques. Connections from circuits or components external to the board must be made to these circuits in assembling the electronic equipment for a particular installation. Because of the small dimensions of the boards and components, such connections are difficult to make and the physical making of such connections is time consuming. It is desirable to have a device by which to permit these connections in a minimum of time and at a low cost.

Certain of the prior art relies on highly specialized printed circuit boards or modules in contrast to the standard circuit board thereby increasing the cost of multi-layer board configurations and the several interconnections tnerebetween. Further, interconnection between circuits on adjacent boards becomes a particular problem in the need for precise alignment of the interconnections between the boards. There is a need for interconnector elements where less precision is required thereby to compensate for the tolerance build-up that may occur.

Such interconnector elements making use of conventional printed circuit technology and uniform boards for all configurations could then be used to readily connect integrated circuit chips as they are presently produced in quantity and at low cost such as dual-in-line or leadless IC packages. Interconnection could be achieved without the use of special tools such as "wire-wrap" techniques and three dimensional configurations for interconnecting integrated circuit chips can be achieved with high density. No special tools would be needed and, with proper placement of such connector means, electronic equipment can be assembled in a relatively short time. Modification of such equipment is readily achieved by changing or repositioning of the connector elements.

STATEMENT OF THE INVENTION

One feature of the invention is a connector element that is flexible, resilient and conductive and that is inserted in a circuit board as an electrical connection between circuits on one or more standard circuit boards. Another feature is a plastic, conductive double-ended plug readily positioned in a standard circuit board and functioning as an electrical connection merely by being positioned in the board. Another feature is a connector plug having a central guiding hole to receive and guide a pin on an external component and thereby create the electrical connection desired. Another feature is a connector plug adapted especially for use with dual-in-line package. One feature is a system of connector plugs usable in multilayer circuit board configurations in making electrical connections between the several boards.

According to the invention, the connector element is a double-ended plug having a shank connecting a large head at one end and an enlarged retainer or smaller head at the other end and being resilient to permit insertion and retention in a standard circuit board and being conductive to establish the desired electrical connection upon insertion in the board. The connector plug has the board-engaging face of the head flat for contact with the board surface and a circuit thereon. The shank of the plug is slightly shorter than the thickness of the board and the circuit thereon so that the shank is stretched when inserted and thus serves to hold the head securely in position.

The head and the retainer are cooperatively shaped so that a connector plug in one board may engage a cooperating plug in an overlying board with the head of one plug engaging the retainer of the other plug for an electrical connection between a circuit on each of the two boards. As a modification, the connector element has a central guiding hole to receive a connecting pin from an external electronic component for establishing a connection from the board circuit to the external component. The recessed plug is especially adapted for use with dual-in-line packages. A V-shaped groove in the head receives the conventional enlargement on the pins of the dual-in-line package.

The interconnecting elements may also be used for example, in IC packages in flat packs or leadless IC packages. This type of package is held in place by a small section of a printed circuit board which will have a rectangular cut-out to accommodate the body of the flat pack, or there may be guides on the base circuit board to position the flat pack or leadless package. With a suitable arrangement of connector plugs proper connections with the surface located contacts on the leadless IC package or the horizontally extending leads on the flat pack may be accomplished.

Other features and advantages will be apparent from the specification and claims and from the accompanying drawings which illustrate an embodiment of the invention.

DETAILED DESCRIPTION OF THE PREFERRED EMBODIMENT

Figure 1:
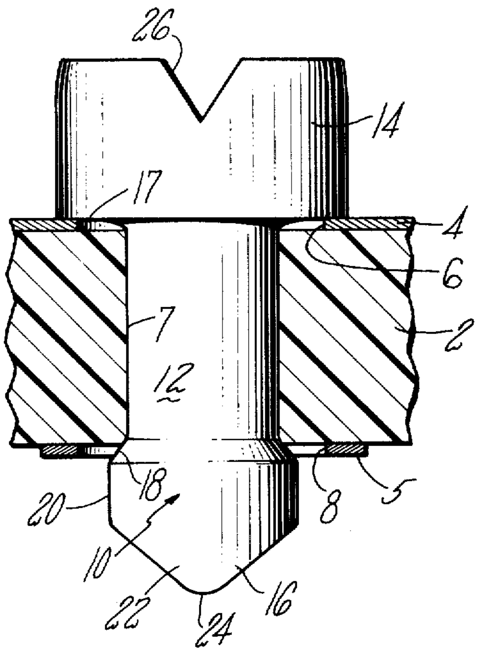
FIG. 1 is a sectional view through a circuit board with a connector element or plug therein.
Figure 2:
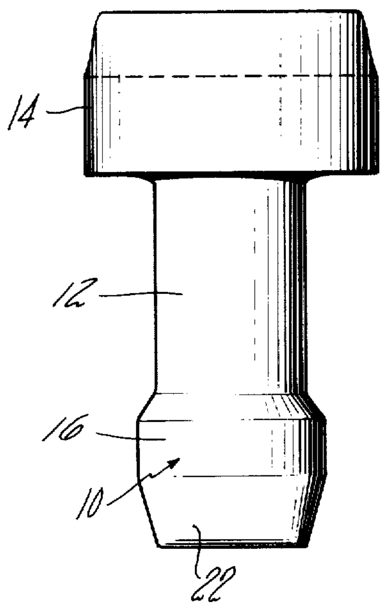
FIG. 2 is an elevation of the plug before insertion in the board, at right angles to the view of FIG. 1.
Figure 3:
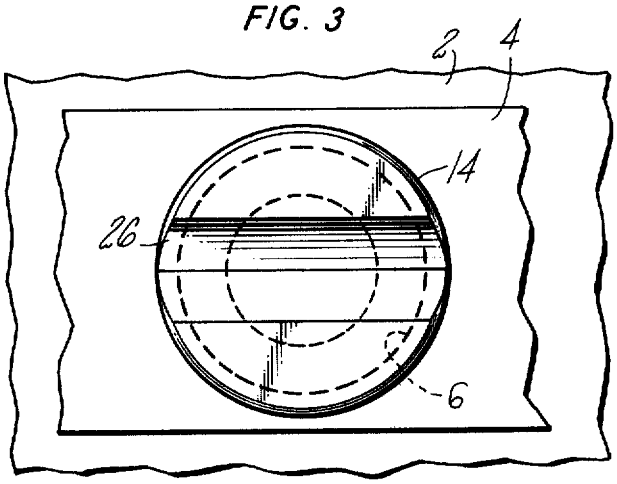
FIG. 3 is a plan view of the structure of FIG. 1.

Referring first to FIGS. 1 to 3 inclusive, the invention is shown in connection with a standard circuit board arrangement including the board 2 with a circuit 4 on one surface thereof in the form of a conductive strip extending in the plane of FIG. 1 of the drawing. This strip is shown in plan in FIG. 3. The board may also have another circuit 5 on the other surface and this circuit is at right angles to the plane of the drawing of FIG. 1. The strip forming circuit 4 has a hole 6 therein larger than and concentric to a hole 7 in the board 2. The strip 5 has a hole 8 therein also concentric to the hole 7 in the board.

The connector element or plug 10 of the invention is in the form of a double-ended plug having a shank 12 positioned in the hole 7 in the board and having a slightly free fit therein so that the plug will stay closely in the assembled position without significant lateral movement. The shank has a large head 14 at one end, this head being large enough to extend beyond the dimension of the hole 6 and overlies a portion of the strip or circuit 4. The other end of the shank 12 has a smaller head or retainer 16 that is small enough to be compressed to pass through the hole 7 in the board but large enough to expand and hold the plug in position within the hole in the board with the underside 17 of the head securely in contact with the circuit 4. The head 14 is larger in diameter than the hole 6 so that it will overlie the circuit 4 as shown in FIG. 1.

The retainer 16 merges with the shank in a frusto-conical portion 18 that engages the end of the hole as shown in FIG. 1 and this frusto-conical portion merges with a cylindrical portion 20 of the retainer, this portion 20 being somewhat larger than the diameter of the hole as shown. The outer end 22 of the retainer is wedge shaped as shown in FIG. 2, terminating in a rounded tip 24 and the opposite ends of the wedge taper slightly toward one another as shown in FIG. 2 for easier insertion through the hole in the board.

The underside 17 of the head 14 is flat and at right angles to the axis of the plug and the top surface has a V-groove 26 having the same taper as the wedge-shaped end of the retainer. The V-groove and rounded tip 24 on the head and retainer are parallel to one another as shown in FIG. 2 and the outer portion of the side wall of the head may be somewhat tapered as shown. The retainer is of such a dimension that it will not contact the strip or circuit 5 at the periphery of the hole therein as shown. The spacing of the underside of the head 14 from the frusto-conical portion 18 on the retainer is such that the shank will be somewhat stretched when the plug is inserted in the board so that the head will be held resiliently against the circuit 4.

The connector element or plug is a resilient conductive material, compressible enough to permit insertion of the retainer through the hole in the circuit board. The material is preferably a conductive silicone or fluorsilicone elastomer with continuously contacting particles of a conductive material embedded therein and exposed on the surface thereof. Such particles may be a silver lattice embedded in the elastomer. Suitable elastomers that retain their resistance to compression set at temperatures suitable for use in this environment are the Silastic rubbers made by Dow Chemical. Such plugs will make an electrical contact with the circuit 4 and will serve as an element in a complete electrical circuit as will be apparent.

An example of the dimensions for a plug of this type is a shank about 0.040 inches in diameter fitting in a similarly sized hole in the standard circuit board. The head 14 is about 0.078 inches in diameter and about 0.040 inches thick. The V-groove may be 0.015 inches deep. The shank is about 0.055 inches long to the frusto-conical portion 18 and this portion is about 0.012 inches long. The large portion of the retainer is about 0.050 inches in diameter and 0.018 inches long. The wedge portion is about 0.020 inches long. Such dimensions are suitable in the use of the plug in a standard circuit board 0.062 inch thick.

These plugs are easily inserted into operative position by compressing the retainer and pushing it through the hole in the board. After insertion, the retainer springs back to full size and serves to hold the plug in position by engaging with the surface of the board around the hole 7. The plug serves as an element in an electrical connection including the circuit 4 and is adapted to contact another electrical contact, circuit or electrical component either on the other side of the board, on an adjacent circuit board or in or on an electronic component external to the board. Other uses for this plug will appear to persons skilled in the art once such plugs become available.

Figure 4:
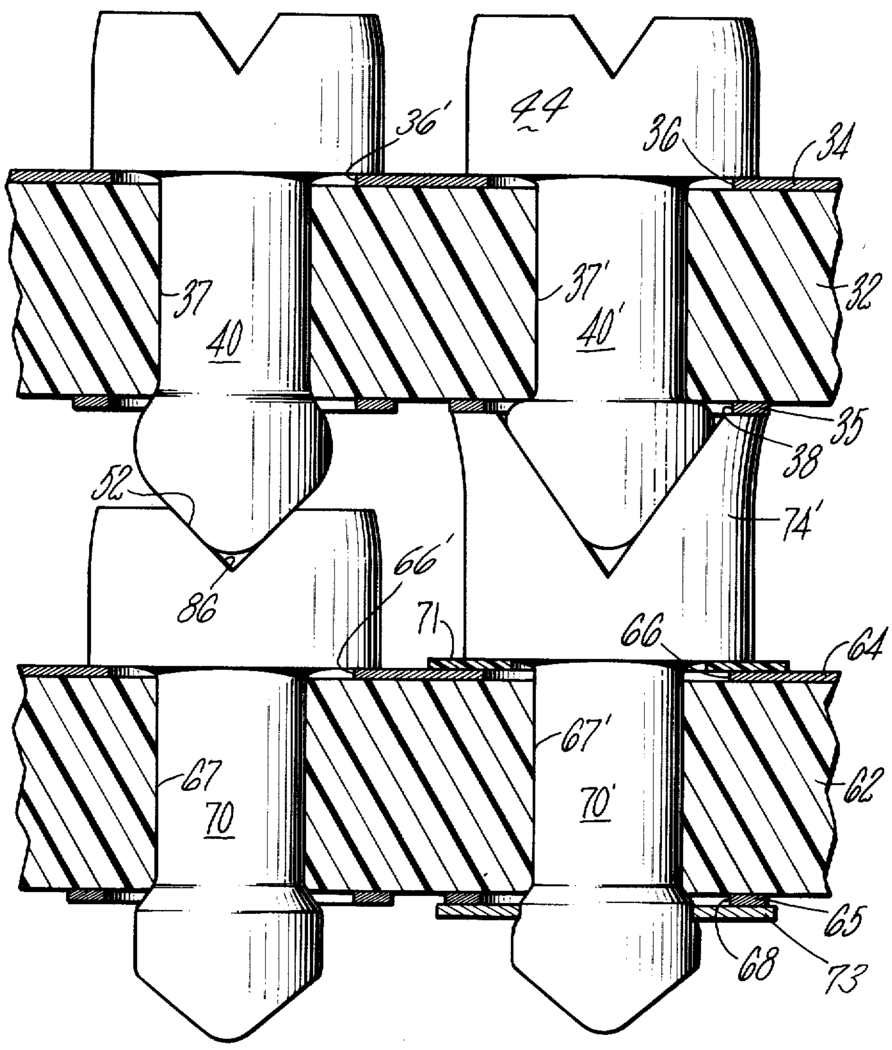
FIG. 4 is a sectional view showing a pair of plugs positioned in each of two boards in a multilayer board configuration and establishing connections between circuits on the two boards.

Several uses for this plug will appear from the showing of FIG. 4. As shown in this figure, two circuit boards 32 and 62 are shown in overlying relation to one another as in multi-layer configurations. Each of these boards has a circuit 34 and 64 respectively on the top side, each with spaced holes 36 and 36' in circuit 34 and holes 66 and 66' in circuit 64. Each board also has a circuit 35 or 65 on the underside with holes 38 and 68 therein. The holes 36 and 38 are concentric to the hole 37 through board 32 and holes 66 and 68 are concentric to the hole 67 through board 62. With the plug 40 positioned in board 32 with the head 44 in contact with circuit 34 and plug 70 inserted in board 62 and in contact with circuit 64 an electrical connection is established between these two circuits 34 and 64 through these plugs merely by placing the two boards in juxtaposition. The wedge 52 on plug 40 and the groove 86 on plug 70 interfit with one another and make a positive electrical connection between the two circuits.

As an alternative, where the electrical connection is to be made between circuit 65 on the bottom of board 62 and the circuit 34 on the top of board 32, the plug 70' will have its head insulated from contact with circuit with circuit 64 by an insulating washer 71 and a connection made with circuit 65 by a conductive washer 73 surrounding the plug and held against the circuit 65 by the retainer on the plug. In this way, the plugs serve as parts of the electrical connection from circuit 34 to circuit 65 merely by positioning the two boards with the plugs therein in overlying relation. Thus, the pair of plugs form a system for interconnecting the two circuits.

The head of the plug is generally made so as not to contact the circuit on the underside of the overlying board as with the plug 70. As a modification, by making the plug head thicker or higher as the head 74 of plug 70' the top surface of the head will engage circuit 35 on the underside of the board 32 and thus include this circuit in the electrical connection made by plugs 40' and 70'. Other modifications and alternatives will be apparent to the person skilled in the art, once the structure and utility of this plug is known.

Figure 5:
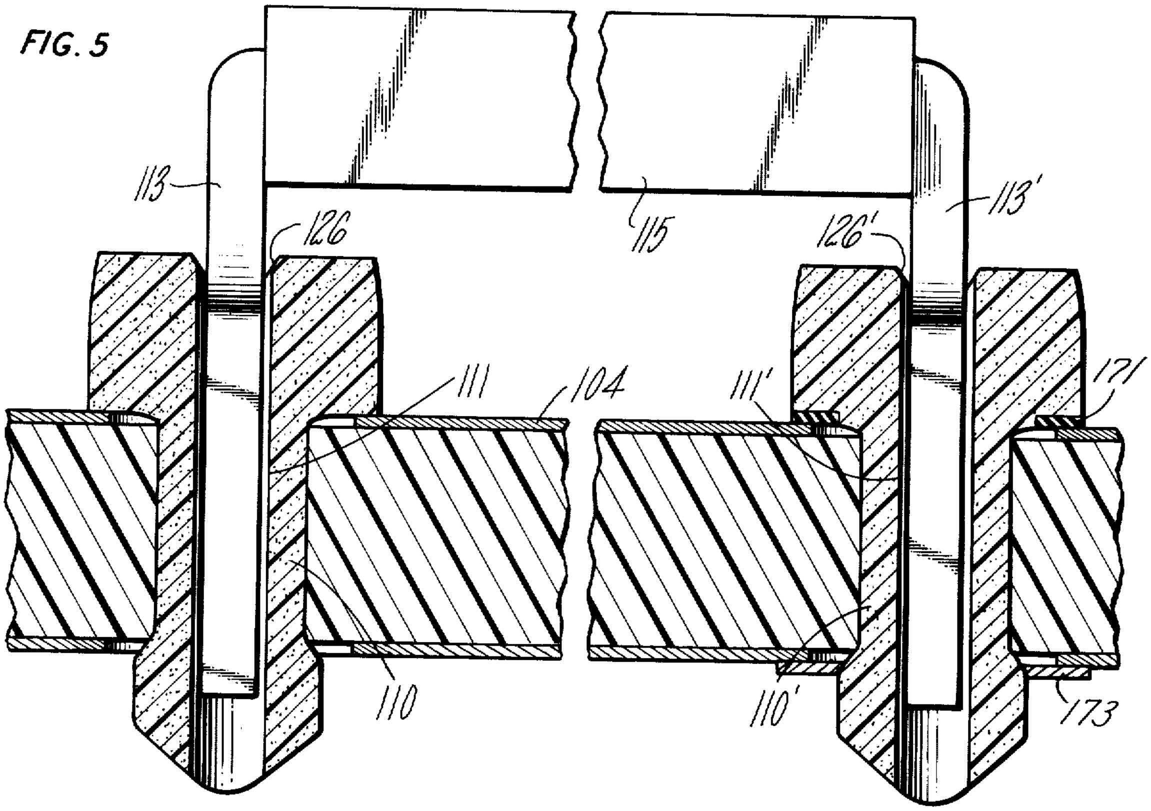
FIG. 5 is a sectional view of a single board with a modified form of plugs therein, and used with a dual-in-line package.
Figure 6:
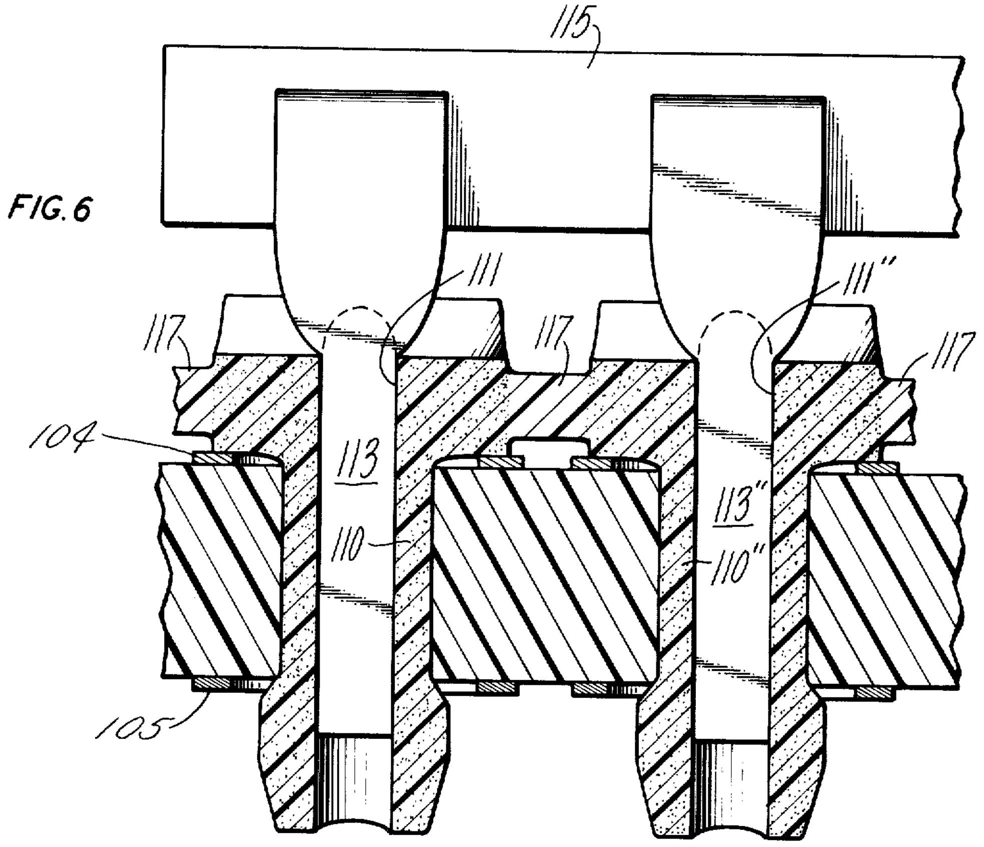
FIG. 6 is a sectional view at right angles to FIG. 5.

Another utility for the plugs is in connecting dual-in-line packages or other external packages to selected circuits. For example, as shown in FIGS. 5 and 6, the board 102 has plugs 110 and 110' inserted therein. Plug 110 is in contact with the circuit 104 on the top surface thereof, and package 110' is insulated by a washer 171. This plug 110' is in contact with the under circuit 105 through a conducting washer 173. Each plug has a central recess 111 and 111' therein. These recesses accept projecting pins 113 and 113' (FIG. 6)

in the spaced parallel rows of connector pins on a dual-in-line package 115, thereby making suitable electrical connections with these pins.

Although the pins of the dual-in-line package may be forced into the plugs without a recess to receive the pin for each plug, less pressure is required to insert the dual-in-line package if the holes are provided. The package may thus be unplugged and replugged in selected installations many times without damage to the packages or the pins thereon.

Figure 7:
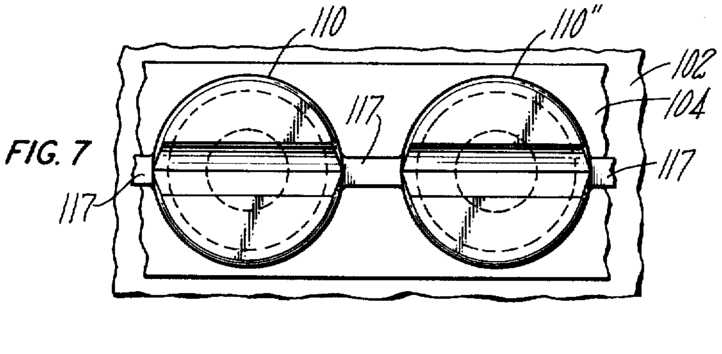
FIG. 7 is a plan view of the board and plugs of FIG. 6 before the positioning of the dual-in-line package thereon.

Since these parallel rows of pins are not always precisely parallel when ready for use, the V grooves 126 and 126' and the holes serve as guides for directing the pins into the recesses in the plugs. It will be noted that the V grooves extend parallel to the rows of pins on the dual-in-line package as shown in these figures. Further, these pins are not round but are flat so that, although the pins do not fill the recesses in one direction, FIG. 6, they are the width of the recess in a direction at right angles thereto as in FIG. 7 so that positive contact is made by the insertion of the package into the position of FIGS. 6 and 7. The insertion of the pin slightly expands the head and increases the pressure of the head on the circuit under the head.

The row of plugs to receive either row of pins on a dual-in-line package may be constructed for insertion as a unit. Thus, the plugs 110 and the other plugs in the same row, the plug 110'' for example are interconnected and properly spaced apart by connecting integral webs 117 between the adjacent heads, see also FIG. 7, which serve to hold the set of plugs together in such an arrangement that the entire set may be positioned at one time in appropriately arranged holes in the circuit board and makes assembly much simpler. The webs are in alignment with the V grooves in the plugs and are of such a length as to space adjacent plugs to the hole spacing and also to the standard spacing of the pins on the package to be positioned in the plugs.

To avoid electrical connection between adjacent plugs in this arrangement, the webs 117 are preferably a non-conducting material, such as well-known elastomers, for example, silicone elastomers so that the individual plugs are insulated from one another. Such webs may be incorporated during the molding process or by such other techniques as will be apparent. Omission of the conductive material from the elastomer in this area would be a simple solution. These assemblies of plugs and webs may be made by a continuous process producing long strips of plugs to be cut to suitable lengths at the webs.

IC packages in flat packs or leadless integrated packages can be accommodated with these plugs so as to allow very dense configurations. The pack is held in place by a small section of a printed circuit board having a rectangular cutout to accommodate the body of the pack and the configuration of plugs is arranged to contact the leads in the pack. Similarly, in the leadless integrated package, a cutout is made to accept the central bulge in the package and the plug configuration is such as to contact the leads in the surface of the package.

Although the plug has been described as made of a conductive elastomer, it may be desirable under certain circumstances to use a nonconductive elastomer, to the surface of which is applied as by painting, spraying or otherwise coating, a pure silver filler in a vinyl polymer, such as produced by Technical Wire Products, of Cranford, New Jersey. The result is a conformal coating having excellent electrical conductivity, adhesion and flexibility as well as good impact resistance.

It should be understood that the invention is not limited to the particular embodiments shown and described herein, but that various changes and modifications may be made without departing from the spirit or scope of this novel concept as defined by the following claims.

I claim:

1. A connector element for making an electrical connection between circuits on circuit boards, said element being made of a resilient, conducting, elastomeric material and including a shank adapted to be positioned in a hole in a circuit board, said shank having a head at each end, each head being larger in diameter than the shank and being formed to provide resilient retention of said element within the hole whereby upon or after insertion each head will overlie and be in contact with the opposite surfaces of the board with one head extending over and in contact with a circuit on the board.

2. A connector element as in claim 1, in which the shank of the element is of such a length that when fitted in the circuit board hole the shank will be under tension and will retain at least one head of the element securely against the board surface and the circuit positioned thereon.

3. A connector element as in claim 1, in which the underside of the larger head is flat for engagement with the board surface and the circuit thereon.

4. A connector element as in claim 1, in which one head is deformable when inserted through a hole in the board smaller in diameter than the diameter of said head.

5. A connector element as in claim 1, in which one head is adapted to be inserted through the board and is substantially smaller than the other head to serve as a retainer.

6. A connector element as in claim 1, in which the element has a central opening therethrough to receive a connecting pin therein.

7. The combination with a circuit board having a conductive circuit on one side thereof, said board having a hole therein to receive a connector therein, of an elastomeric connector element having a shank to fit in the opening in said board, said shank having a head at one end to overlie one surface of the board, and being large enough to overlie a part of the circuit thereon, the other end having a retainer portion larger than the hole in the board and compressable for insertion through the hole, said connector element being resilient and conductive to provide an electrical connection with said circuit.

8. The combination as in claim 7, in which the length of the shank is less than the thickness of the board and the printed circuit thereon.

9. The combination as in claim 7, wherein there are two circuit boards with a similarly located connector element in each board, and the boards are stacked with the connector elements in contact, thereby establishing electrical connections between the circuits on the two boards engaged by the connector elements.

10. A plurality of connector elements for making electrical connections between circuits on standard circuit boards, each connector being made of resilient conducting elastomeric material and including a shank adapted to be positioned in a hole in a circuit board, said shank having a head at one end to overlie and be in contact with a circuit on the surface of the board, said shank having a retainer at the other end formed larger than the hole but of a dimension to be distorted upon insertion through the hole in the board, and a web connecting the heads of each of said plurality of connector elements for holding said elements in parallel relation to one another and in such proper spacing as to fit within spaced holes in the circuit board.

11. A plurality of connector elements as in claim 10 in which the webs are nonconductive so they electrically isolate one connector element from another.

12. A plurality of connector elements as in claim 10 in which the heads have grooves therein and the webs are formed with connector element to provide such that the grooves in the several heads are in alignment with each other.

13. A plurality of connector elements as in claim 12 in which the connectors have central recesses and the webs support the connectors for engagement by the pins of a dual-in-line package, and the recesses accept and guide the pins to reduce the insertion pressure.

14. A connector element for use with circuit boards to establish an electrical connection with at least one part of a circuit on one surface of a board, the board having a hole therethrough adjacent said part, said element being a conductive resilient elastomer and having a shank adapted to be positioned in the hole and having a large head at one end formed to overlie the one surface of the board and to engage therewith, the dimension of said head being large enough to overlie and engage with the part of the circuit adjacent to the hole to make an electrical connection therewith when said element is positioned in the hole.

15. The combination with a circuit board having a conductive circuit on one side thereof, said board having at least one hole therethrough, of a connector element for making an electrical connection with said circuit, said element being made of a resilient, conducting, elastomeric material and including a shank adapted to be positioned in the hole in the circuit board, said shank having a head at each end, each head being larger in diameter than the shank and being formed to provide resilient retention of said element within the hole whereby upon or after insertion each head will overlie and be in contact with the opposite surfaces of the board with one head extending over and in contact with a portion of the circuit on the board.

16. The combination as in claim 15 in which one head of the element is deformable for insertion through the hole in the board, the hole being smaller in diameter than the head.

17. A connector element for making an electrical connection with a circuit on a circuit board, said board having a hole to receive the element, said element being made of a resilient conductive elastomeric material of such density and consistency as to receive an external component pin and be expanded thereby, said element including a shank of a dimension to fit within the hole in the board, said shank having a head at each end larger than the shank and being formed to provide resilient retention of said element with the heads in contact with the opposite surfaces of the board and with one head in contact with a circuit on the board.

18. A connector element as in claim 17 in combination with an external component pin positioned in said element and making contact therewith.

19. The combination with a circuit board having a circuit on one side thereof and at least one hole through the board, of a connector element for use with the circuit board to establish an electrical connection with at least one part of a circuit on the one side of a board, the hole in the board being adjacent said part of the circuit, said element being a conductive and resilient elastomer and having a shank adapted to be positioned in said hole, the element also having a large head at one end formed to overlie the one side of the board and to engage therewith, the dimension of said head being large enough to overlie and engage with the part of the circuit adjacent to the hole to make an electrical connection therewith when said element is positioned in the hole.

20. The combination with a circuit board having a circuit on one side and at least one hole through the board, of a connector element positioned in said hole, said element being a conductive resilient elastomer having a shank in said hole, said element having a head on one end to overlie said one said of the board, the dimension of the head being large enough to engage a portion of said circuit adjacent to the hole and to make a connection therewith, and said shank substantially filling the hole.

21. The combination of claim 20 in which the material of the element is of such density and consistency that it is penetrable by an external component pin thereby making contact from said pin to the circuit on the board.

* * * * *